United States Patent
McCoy

(10) Patent No.: US 9,858,207 B2
(45) Date of Patent: Jan. 2, 2018

(54) PAGE LEVEL KEY-BASED MEMORY PROTECTION

(71) Applicant: International Business Machines Corporation, Armonk, NY (US)

(72) Inventor: Doyle J. McCoy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/760,459

(22) Filed: Feb. 6, 2013

(65) Prior Publication Data

US 2014/0223129 A1  Aug. 7, 2014

(51) Int. Cl.
  G06F 12/14 (2006.01)
  G06F 21/60 (2013.01)
  G06F 11/07 (2006.01)
  G06F 21/62 (2013.01)

(52) U.S. Cl.
  CPC ...... G06F 12/1466 (2013.01); G06F 11/0787 (2013.01); G06F 12/1408 (2013.01); G06F 21/602 (2013.01); G06F 21/62 (2013.01)

(58) Field of Classification Search
  None
  See application file for complete search history.

(56) References Cited

U.S. PATENT DOCUMENTS

| | | | |
|---|---|---|---|
| 4,399,524 A | 8/1983 | Muguruma | |
| 4,528,666 A | 7/1985 | Cline et al. | |
| 5,673,419 A | 9/1997 | Nisar | |
| 6,351,838 B1 | 2/2002 | Amelia | |
| 6,854,039 B1 | 2/2005 | Strongia et al. | |
| 7,117,373 B1 * | 10/2006 | Trimberger et al. | 713/193 |
| 7,149,901 B2 * | 12/2006 | Herbert et al. | 713/190 |
| 7,210,014 B2 | 4/2007 | Drasnin et al. | |
| 7,237,082 B1 | 6/2007 | Garnett | |
| 7,673,345 B2 | 3/2010 | Cheng et al. | |
| 8,108,641 B2 | 1/2012 | Goss et al. | |
| 8,171,309 B1 | 5/2012 | Poo et al. | |

(Continued)

FOREIGN PATENT DOCUMENTS

CN  1967508 A  11/2005

OTHER PUBLICATIONS

Kernel.org, 'Chapter 3 Page Table Managment', Oct. 27, 2011, http://web.archive.org/web/20111027231210/http://kernel.org/doc/gorman/html/understand/understand006.html.*
Wikipedia, "Memory Protection", http://en.wikipedia.org/wiki/Memory_protection, Printed Jul. 2, 2012, pp. 1-4.
General Programming Concepts: Writing and Debugging Programs, "Storage Protect Keys", http://publib.boulder.ibm.com . . . , Printed Feb. 6, 2013, pp. 1-8.
"Specifying an Activation Group", http://publib.boulder.ibm.com . . . , Copyright IBM Corporation 1992, 2006, 1 page.
Yong Zhuang, PCT Notification of Transmittal of the International Search Report and the Written Opinion of the International Searching Authority, or the Declaration, International Application No. 1B2014/058568, Date of Mailing Jun. 11, 2014, 6 pages.

*Primary Examiner* — Reginald Bragdon
*Assistant Examiner* — Edward Wang
(74) *Attorney, Agent, or Firm* — William H. Hartwell; Maxine L. Barasch; Keohane & D'Alessandro PLLC

(57) ABSTRACT

Embodiments of the present invention provide an approach for memory protection at a level of granularity above a "page" level (e.g., enhancing the protection provided by a memory key-based system). The approach further provides such a level of protection at a process or task level by associating the physical page key with a virtual key that corresponds to a particular process/task. When access to the data is requested for a particular process or task, it is determined if a protection bit for the data is set, and if the physical page keys and/or virtual keys submitted pursuant to the request match that previously stored for the data and process/task. If so, access to the data is allowed for the particular process/task.

22 Claims, 10 Drawing Sheets

(56) References Cited

U.S. PATENT DOCUMENTS

| | | |
|---|---|---|
| 8,209,509 B2 | 6/2012 | Renno |
| 2004/0255145 A1 | 12/2004 | Chow |
| 2005/0262341 A1 | 11/2005 | Field |
| 2005/0268058 A1 | 12/2005 | Drasnin |
| 2006/0036823 A1* | 2/2006 | Mathews et al. ............. 711/164 |
| 2006/0059553 A1* | 3/2006 | Morais et al. ................ 726/22 |
| 2008/0133842 A1 | 6/2008 | Raikin et al. |
| 2008/0232582 A1* | 9/2008 | Chevallier-Mames et al. ................ 380/44 |
| 2009/0249034 A1* | 10/2009 | Sato .................... G06F 11/1004 712/214 |
| 2010/0042824 A1 | 2/2010 | Lee et al. |
| 2010/0281273 A1 | 11/2010 | Lee et al. |
| 2014/0237261 A1* | 8/2014 | Diep .................. G06F 12/1408 713/189 |

* cited by examiner

PAGE LEVEL KEY-BASED MEMORY PROTECTION

TECHNICAL FIELD

Embodiments of the present invention relate to data security management. Specifically, embodiments of the present invention relate to a key-based approach for protecting data.

BACKGROUND OF THE INVENTION

Statutory provisions today may include aspects that affect many industries with concerns such as personal data security, banking data security, medical data protection, etc. As these provisions become increasingly complex, it has become more difficult for a service provider to avoid access to unauthorized data and still provide their contracted services. One cause of such issues has to do with data residing in main storage and the ability of a processor to load that data for use by an application that is genuinely entitled to access that data at that moment in time versus an application that has not been entitled to access that information.

Another complication has to do with collecting data for use as a service provider and the ability of that service provider to perform service work needed to solve problems on that computer system. Specifically, when variables go out of scope in a system, or are de-allocated in memory allocation systems, it is possible for that memory to remain visible to other parts of the computer system. This could potentially allow harmful code execution to read that memory and obtain the information that was not cleared by a software initialization or the like.

SUMMARY

Embodiments of the present invention provide an approach for memory protection at a level of granularity above a "page" level (e.g., enhancing the protection provided by a memory key-based system). The approach further provides such a level of protection at a process or task level by associating the physical page key with a virtual key that corresponds to a particular process/task. When access to the data is requested for a particular process or task, it is determined if a protection bit for the data is set and if the physical page keys and/or virtual keys submitted pursuant to the request match that previously stored for the data and process/task. If so, access to the data is allowed for the particular process/task.

A first aspect of the present invention provides a computer-implemented method for managing data security, comprising: identifying a set of pages of data in computer storage; generating a physical key for each page of the set of pages, the physical key being stored in at least one table; generating a virtual key based on each physical key, the virtual key identifying at least one process authorized to use the data, and the virtual key being stored in at least one register; protecting each page of the set of pages with a respective physical key and corresponding virtual key; and setting a data protection bit to a particular setting to indicate a protective status of the set of pages of data.

A second aspect of the present invention provides a system for managing data security, comprising: a bus; a processor coupled to the bus; and a memory medium coupled to the bus, the memory medium comprising instructions to: identify a set of pages of data in computer storage; generate a physical key for each page of the set of pages, the physical key being stored in at least one table; generate a virtual key based on each physical key, the virtual key identifying at least one process authorized to use the data, and the virtual key being stored in at least one register; protect each page of the set of pages with a respective physical key and corresponding virtual key; and set a data protection bit to a particular setting to indicate a protective status of the set of pages of data.

A third aspect of the present invention provides a computer program product for managing data security, the computer program product comprising a computer readable storage media, and program instructions stored on the computer readable storage media, to: identify a set of pages of data in computer storage; generate a physical key for each page of the set of pages, the physical key being stored in at least one table; generate a virtual key based on each physical key, the virtual key identifying at least one process authorized to use the data, and the virtual key being stored in at least one register; protect each page of the set of pages with a respective physical key and corresponding virtual key; and set a data protection bit to a particular setting to indicate a protective status of the set of pages of data.

A fourth aspect of the present invention provides a method for deploying a system for managing data security, comprising: providing a computer infrastructure being operable to: identify a set of pages of data in computer storage; generate a physical key for each page of the set of pages, the physical key being stored in at least one table; generate a virtual key based on each physical key, the virtual key identifying at least one process authorized to use the data, and the virtual key being stored in at least one register; protect each page of the set of pages with a respective physical key and corresponding virtual key; and set a data protection bit to a particular setting to indicate a protective status of the set of pages of data.

BRIEF DESCRIPTION OF THE DRAWINGS

These and other features of this invention will be more readily understood from the following detailed description of the various aspects of the invention taken in conjunction with the accompanying drawings in which.

Figure 1:
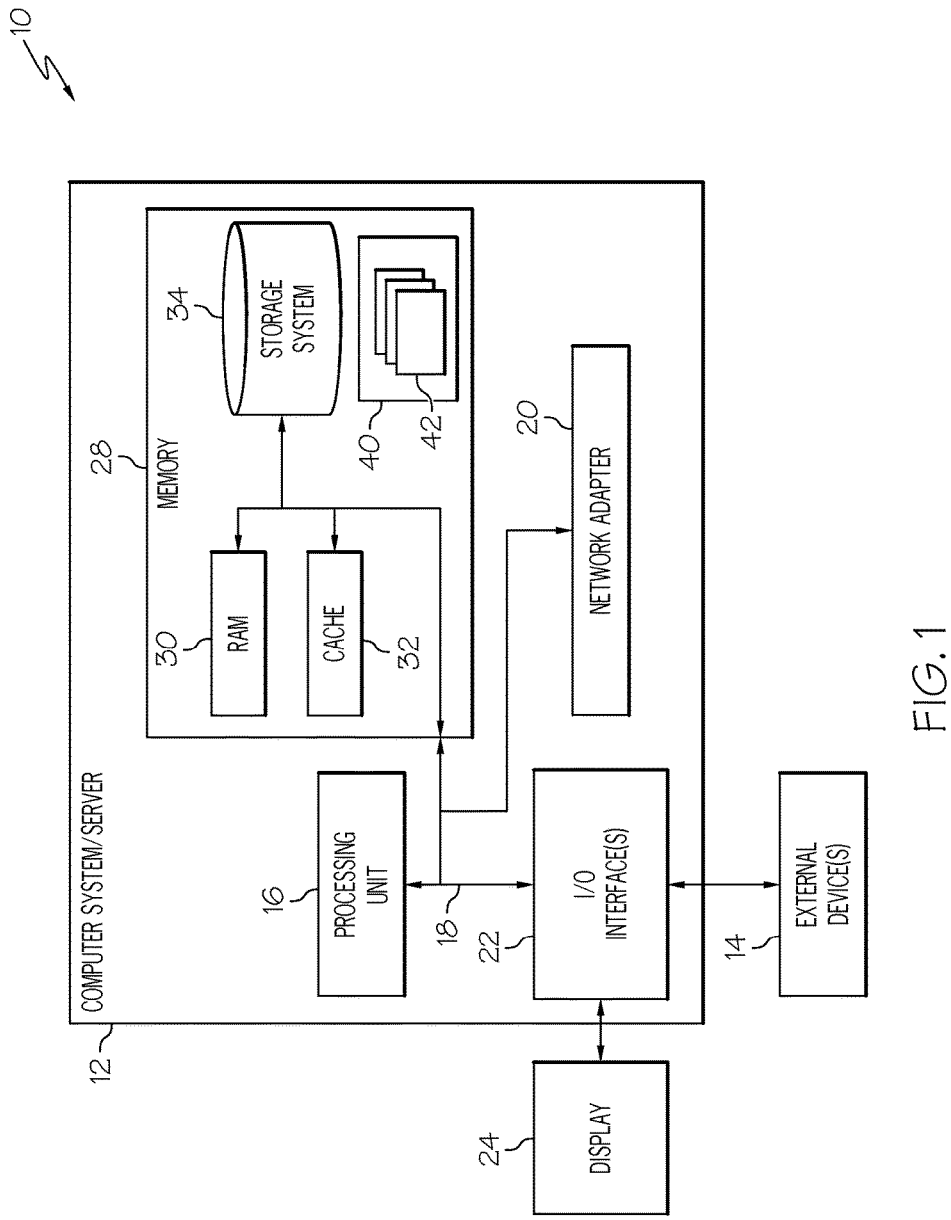
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for memory protection at a level of granularity above a "page" level (e.g., enhancing the protection provided by a memory key-based system). The approach further provides such a level of protection at a process or task level by associating the physical page key with a virtual key that corresponds to a particular process/task. When access to the data is requested for a particular process or task, it is determined if a protection bit for the data is set, and if the physical page keys and/or virtual keys submitted pursuant to the request match that previously stored for the data and process/task. If so, access to the data is allowed for the particular process/task.

Performance is greatly enhanced over several known security alternatives. Larger quantities of memory may be protected, while each granularity of protection is still controllable. Increased serviceability is provided for data collection processes through the use of memory access exception handlers and replacement text for those granularities of memory whose data protection bits are set. This allows companies who cannot send data to a service provider for any of various reasons to be able to collect data needed to solve system problems in a sensitive environment. The requirement for data security is driven back to the application programmer with operating system, which enables further support for restrictive Euro-laws with respect to physical location of data stored and location of person accessing data, as well as authentication of user accessing data.

An aspect of the present invention provides for a system of memory protection at a level of granularity above the page level (enhancing the protection provided by a memory keys system). As further described above, a similar level of protection is provided hereunder at the process or task level by associating a key with a logical page of storage to enable page level granularity by comparing that key associated with the page of storage to the protection bits. If a data protection bit is set and a key for the page of data mismatches that of the current processor or thread, a protection exception occurs. Such functionality is enabled by (among other things):

Defining a data protection bit to go along with some granular level of memory access (such as a word, a cache line, etc). The bit would be stored either: (a) an EMP page, or (b) along with memory by adding an extra bit to coexist with some granular level of memory.

Defining a physical page key to be stored for each page in the physical page table of a system. In one embodiment, this physical page key list could be stored in a separate table addressable by the kernel or system state of the operating system only. An embodiment of the physical page key could create it as a compressed key from which other virtual page keys could be derived for use by processes. Another embodiment could (with a lower level of security) store the physical page key and provide that key directly to the processes in lieu of a derived virtual page key.

Defining a virtual page key to go along with the process or task image. This virtual page key could be saved and restored as a part of call/return methods such as stack frames. The virtual page key could also be defined as a part of a unique activation.

Defining a central processing unit (CPU) register to store the current context's virtual page key during runtime (such as used for memory key page protection).

Defining a software mechanism to create a physical page key from which process-derived keys may be defined. A physical page key would be created and associated with an owning process, and possibly at an activation group level where necessary.

Defining a software mechanism to securely derive a process key from a physical page key through the use of a reference to the physical page key. No user level process would ever be able to read a physical page key directly. At process creation, an operating system could request creation of a physical page key followed by derivation of a virtual page key for that activation or process. A main process could then use a function to duplicate the reference to the physical page key. In one embodiment, the physical page key reference may only be valid for the process or thread identifier associated with the context in question. In another embodiment, it may be possible to create a virtual page key that was usable process wide. In yet another embodiment, it may be possible to create separate thread level virtual page keys, and even a separate activation for a thread such that a thread's storage could be isolated from other threads in the same process context.

Defining a hardware mechanism to store a protection bit along with the data of user registers. This would increase the size of the user register itself by one bit.

Defining an architecture to maintain and control the protection state of data: (1) loaded into the CPU from components (e.g., memory, another register, an I/O device, arithmetic operation (including controls within a floating point co-processing subsystem), immediate data, etc.), and/or (2) stored in/from the CPU (e.g., to memory, and I/O device, etc.)

Defining an I/O architecture to enable either DMA or MMI/O, as well as other I/O mechanisms to support providing a memory protection mask for the memory in which an I/O read operation is to be performed; or to allow the I/O write operation to complete.

Along these lines, the following terminology may be utilized hereunder:

Physical Page Key—A key created by an operating system to provide physical page level data protection.

Virtual Page Key—A key derived from a physical page key. This key is intended for process contexts to use during memory access operations.

Data Protection Bit—A bit to be associated with a granularity of memory (such as a word or memory cache line, but intended to be smaller than a physical page of memory). An "on" state indicates the data stored in this granular memory location is protected from access by any process or thread context not having the correct virtual page key that matches or is derived from the physical page key. With the data protection bit on and a "mis-compare" of the virtual page key signature against the physical page key signature, a data access violation exception can be signaled. In one embodiment, a memory access violation may include additional exception information to describe the reason for the memory access violation as being an attempt to operate on memory with an incorrect virtual page key.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Data security program/utility 40, having a set (at least one) of program modules 42, may be stored in memory 28 by way of example, and not limitation. Memory 28 may also have an operating system, one or more application programs, other program modules, and program data. In general, Data security 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
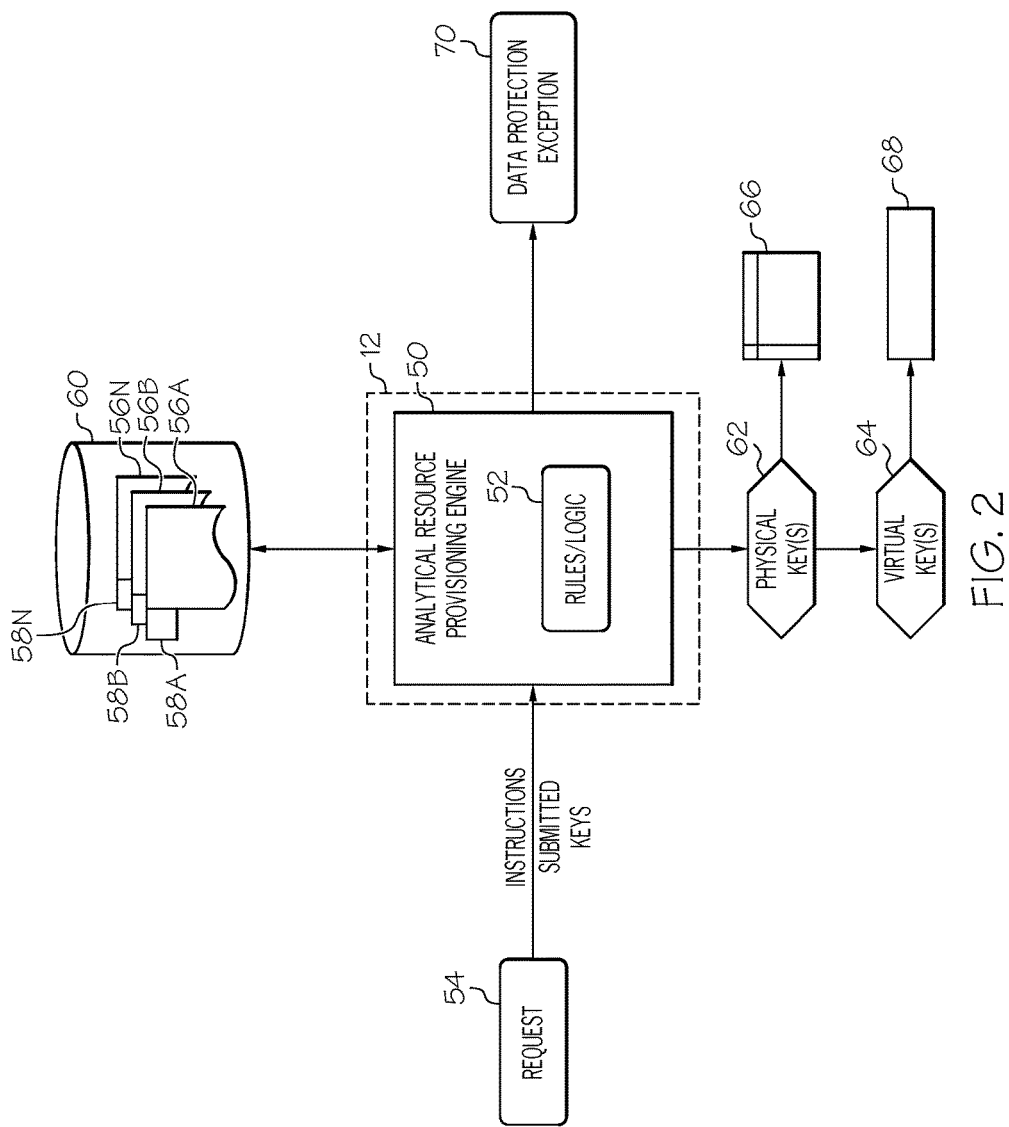
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment, each client need not have a data security engine (engine 50). Rather, engine 50 could be loaded on a server (e.g., payment processing server) or server-capable device that communicates (e.g., wirelessly) with the clients to provide data security functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides data security functionality hereunder.

Along these lines, engine 50 may perform multiple functions similar to a general-purpose computer. Specifically, among other functions, engine 50 may (among other things): identify a set of pages of data 56A-N in computer storage 60; generate a physical key 62 for each page of the set of pages 56A-N, the physical key 62 being stored in at least one table 66; generate a virtual key 64 based on each physical key 62, the virtual key 64 identifying at least one process authorized to use the data, and the virtual key 64 being stored in at least one register 68; protect each page of the set of pages 56A-N with a respective physical key 62 and corresponding virtual key 64; set a data protection bit 58A-N to a particular setting (e.g., "protected") to indicate a protective status of the set of pages of data 56A-N; receive a request 54 to access the data (in pages 56A-N) for a particular process (the request having instructions and submitted keys such as a submitted physical key and/or virtual key); determine if the data projection bit 58A-N (i.e., associated with the page(s) of data sought to be accessed) is set to the particular setting; identify, based on the at least one table 66 and the at least one register 68, at least one physical key 62 and at least one virtual key 64 that corresponds to the data page(s) and the particular process; determine if the at least one physical key 62 and the at least one virtual key 64 match a physical key and a virtual key associated with the request 54; make, based upon the determining, an authentication determination for the requested access to the data; signal a data protection exception 70 if any one of the at least one physical key 62 and at least one virtual key 64 mismatch the physical key and the virtual key associated with request 54; clear a set of user registers (104A-N of FIG. 7) whose corresponding data protection bits (102A-N of FIG. 7) are engaged in response to a virtual page key register 68 being loaded in a system state; toggle (e.g., clear or set) the data projection bit (210A-N of FIG. 8) based upon an instruction; transfer the data projection bit (308A-N of FIG. 9) between a set of user registers (306A-N of FIG. 9) during at least one of a load operation and an arithmetic operation; and/or set a data protection bits (404A-N of FIG. 10) associated with a data processing result based on a data protection bit (404A-N of FIG. 10) associated with an operand (402A-N of FIG. 10) of a machine instruction.

Figure 3:
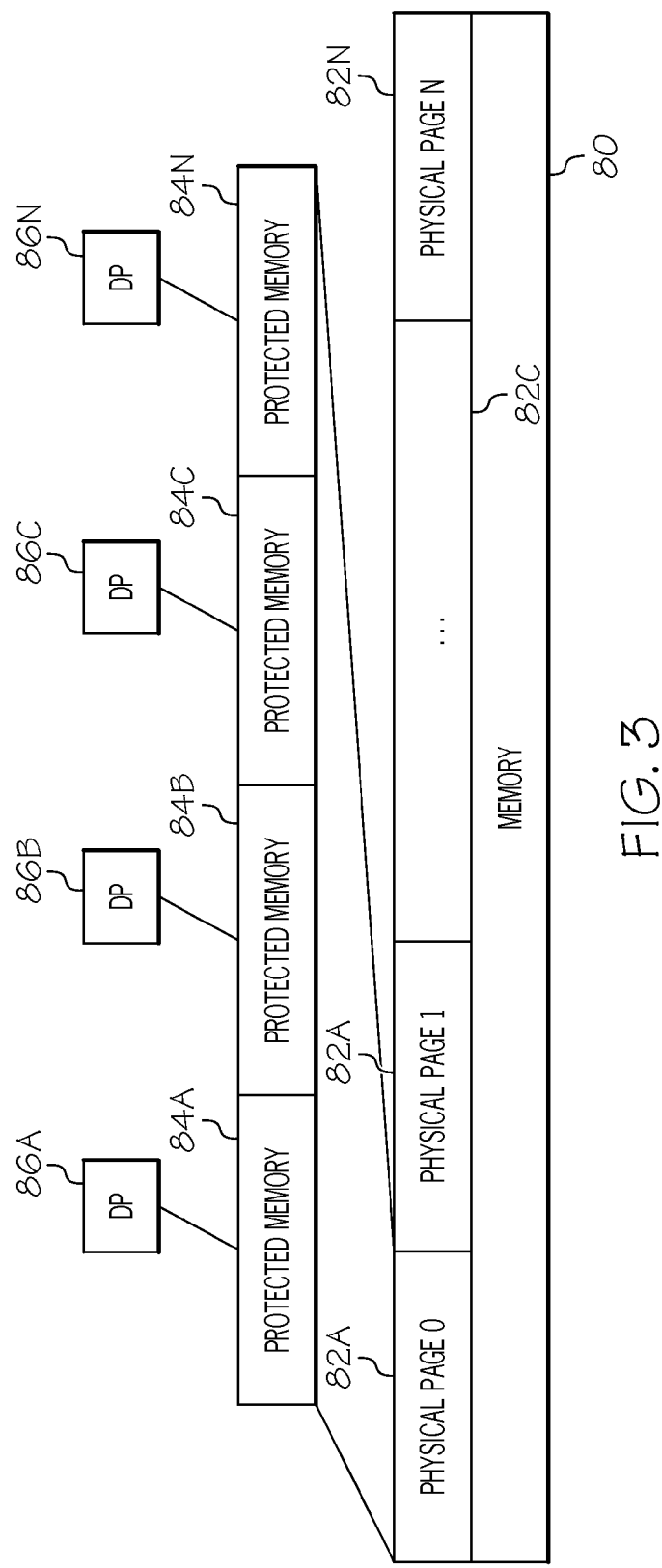
FIG. 3 depicts a data protection bit schema according to an embodiment of the present invention.

In describing these concepts in further detail, the following definitions may be utilized:

Data Protection (DP) Bit:

As indicated above, a data protection bit is defined to be associated with some level of granularity of system memory. An example of this is shown in FIG. 3. As depicted, each physical page 82A-N in memory/storage 80 may have a block protected memory/data 84A-N and an associated data protection (DP) bit 86A-N. Specifically, for effective system performance, each DP bit 86A-N should be associated with a block of memory 84A-N that can be bracketed by addresses that are on a power of two boundary, so that each segment of protected memory could be one byte, two bytes, four bytes, etc., wide. An ideal performance boundary may be that of one cache line in width for L3 or L2 cache associated with the processor.

Figure 4:
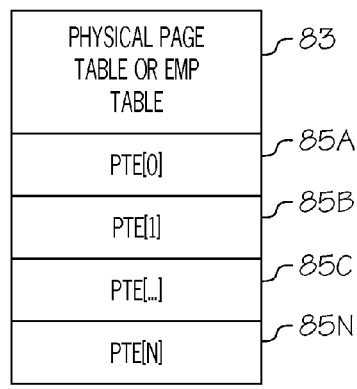
FIG. 4 depicts a physical page table in which physical page keys may be stored according to an embodiment of the present invention.
Figure 5:
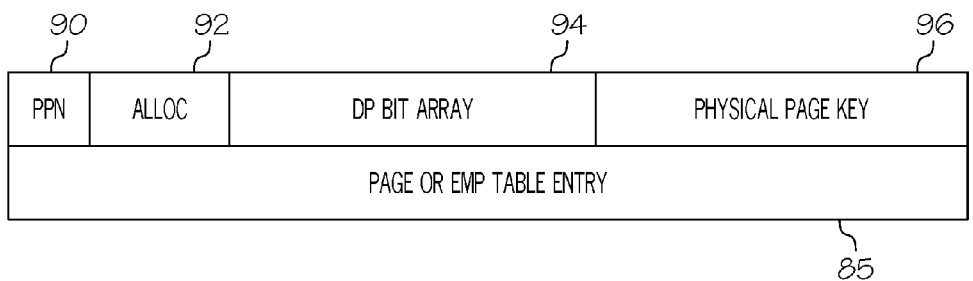
FIG. 5 depicts a table entry associated with other components according to an embodiment of the present invention.
Figure 6:
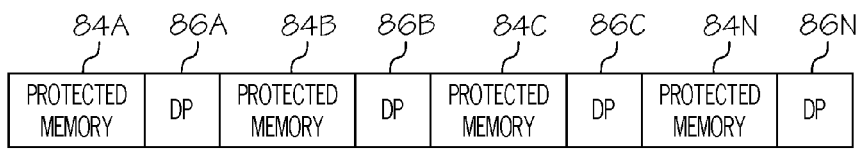
FIG. 6 depicts the association of protected memory/data with a data protection bit according to an embodiment of the present invention.

In one embodiment, the DP bit would be stored as an array of bits associated with a physical page table 83 (an extended memory protection table (EMP)) having page table entries (PTEs) 85A-N as shown in FIG. 4. FIG. 5 shows further details of this embodiment in which a table entry 85 is associated with a physical page number (PPN) 90, an allocation bit 92, a DP bit array 94, and a physical page key (PPK) 96. Another embodiment could request the computing hardware to store the additional bit as a physical part of each memory column (increasing a word size by one bit). An example of this is shown in FIG. 6. As depicted, each block of protected memory 84A-N is associated/stored with its corresponding DP bit 86A-N. One advantage of storing the array as a part of the physical page table or as a part of an EMP table is that the size of the protection could be varied through hardware and software configurations in the processor.

The DP bit is used to indicate that the protected piece of memory (see FIG. 3) is either access protected or not. Access protection means that an attempt to load or store data to the protected piece of memory requires special handling by the system CPU. This special handling involves comparison of the physical page key's signature before allowing the operation.

Physical Page Key (PPK):

The physical page key is a unique number or key generated for comparison purposes for all protected memory ranges within a physical page of memory. Various embodiments could be used to provide this key, including simple random number generation, sequential number generation, or more complicated solutions such as a signed private key generation (i.e., as used in open secure sockets layer (SSL) and other encryption systems). However, an intermediate approach not intended for use in communication would seem more appropriate.

One objective of a key-based system is to allow two functions to be derived. The first function can produce a signature of the physical page key. The second function is one where an additional key can be produced whose signature is the same as that of the physical page key (e.g., see virtual page key below for details). Each generated physical page key would need to be unique along with the signature of that page key. A physical page key does not need to be generated for each physical page of memory. Instead, the physical page key would be created when a new activation or process is created. Thus, the number of unique page keys does not need to equal the physical number of memory pages in the system. Because of the unique requirement of the physical page key and the signature of that physical page key, it makes sense that a master function and table be provided within the kernel of the operating system to generate the key and track those keys and signatures.

In one embodiment, the physical page key and the signature of that physical page key could be the same. In another, a larger or more complex physical page key could exist whose signature is smaller, while still providing a unique signature for all values in use. The physical page key would be stored along with the physical page table or along with an extended memory protection table (see FIG. 5).

Virtual Page Key (VPK):

A virtual page key has one or more unique numbers which are used to refer to a physical page key for the purposes of memory storage. The purpose of a virtual page key is one that allows more than one process to be allowed to operate on a physical page of memory, thus providing support for memory protection in shared memory spaces. The virtual page key must have a function that can produce a signature that in one embodiment refers to the physical page key or, in another, the signature of the physical page key. The function to produce this could be software or a hardware implemented lookup function to simply load the signature or key of the physical page key for comparison purposes.

CPU Virtual Page Key (VPK) Register:

This is a register that would need to be a part of the CPU to store the virtual page key that is in use by the current context (such as a process, thread, or activation). In one embodiment, no user-state methodology would exist to load this register into a user register or to store it into memory. Instead, this register would need to be loaded with a signature of the virtual page key during context switch in, or during creation of a new process or activation.

Register Data Protection (DP) Bits:

Each user register within the CPU of the computer system would need to be enhanced to provide storage for the data protection bit. This bit would be passed along with user register operations. This bit would also be provided in floating point registers and arithmetic and logic units.

Figure 7:
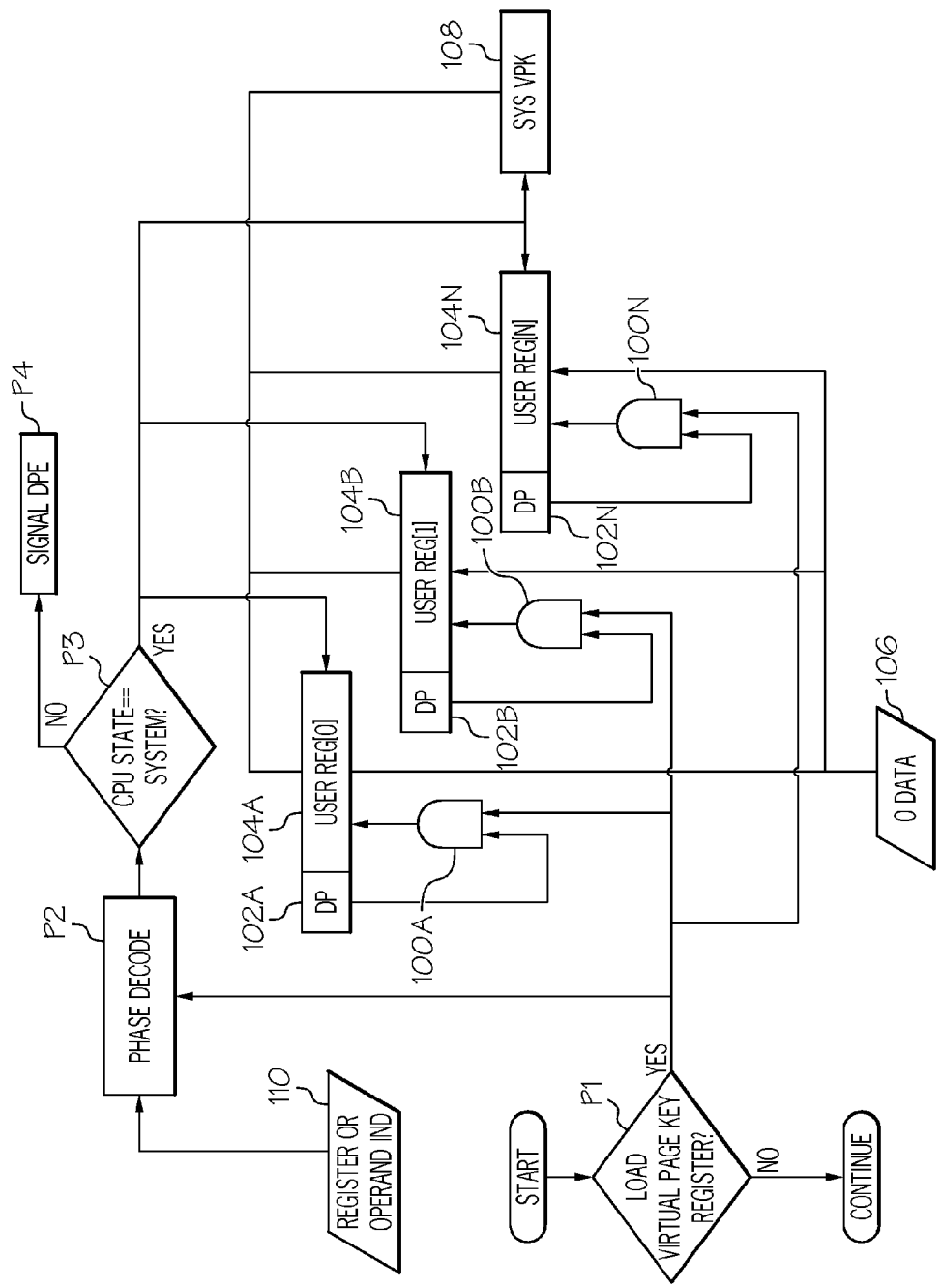
FIG. 7 depicts a process flow diagram according to an embodiment of the present invention.

CPU Data Protection Operations:

The CPU of such a system may be enhanced to meet one or more requirements. One constraint of such a system is that no mechanism may exist to bypass data protection bits when they are set "on" while the CPU is in a user state. This may include the storage of the key currently stored in the CPU into virtual memory accessible by a user process. So, during an interrupt processing, etc, this data may be stored (with operating system (OS) support) in kernel memory space. As such, the approach described herein provides (among other things) one or more of the functions set forth below:

One function provided, as described in FIG. 7, is the ability to clear user registers 104A-N whose data protection (DP) bit 102A-N is set "on" when the CPU's virtual page key register 108 is loaded to a system state. In this instance, the DP bits 102A-N would also be cleared. For this operation, it is determined in step P1 whether instruction decoding a step of the CPU has determined that an instruction is a load to the virtual page key register 108. If not, the process may continue. If so: (1) A zero data 106 is latched to a register data bus of the CPU; (2) The DP bit 102A-N of each register is read and used to drive a respective AND gate 100A-N whose other operand is a store "strobe" of the same register; (3) as a result of the store being raised to those registers 104A-N whose DP bit 102A-N is "on", the zero data that is on the data bus is latched into the register. Next, a phase decode is performed in step P2 on an instruction 110 (e.g., register or operand instruction), and it is determined if the CPU state is set equal to "system" in step P3. If not, a data protection exception may be triggered in step P4. If so, the system performs the next step of selecting user register from the instruction, and loading the corresponding data onto the data bus. Then, a latch operation may be performed on the system virtual page key register 108. In one embodiment, the virtual page key register 108 may become zero if the DP bit of the selected register is set. In another embodiment, the virtual page key register 108 could be loaded first. However, loading the virtual page key register 108 first may result in a security exposure if any other data storage exception is taken and not handled properly before the registers are cleared. In another embodiment, virtual page key register 108 may require a looped load from multiple registers in order to fully load the register. In yet another embodiment, virtual page key register 108 may be loaded from a memory operand, although some security exposure exists with this methodology requiring the operating system to be in a state such that user state programs could not have visibility to memory containing the virtual page key values.

Figure 8:
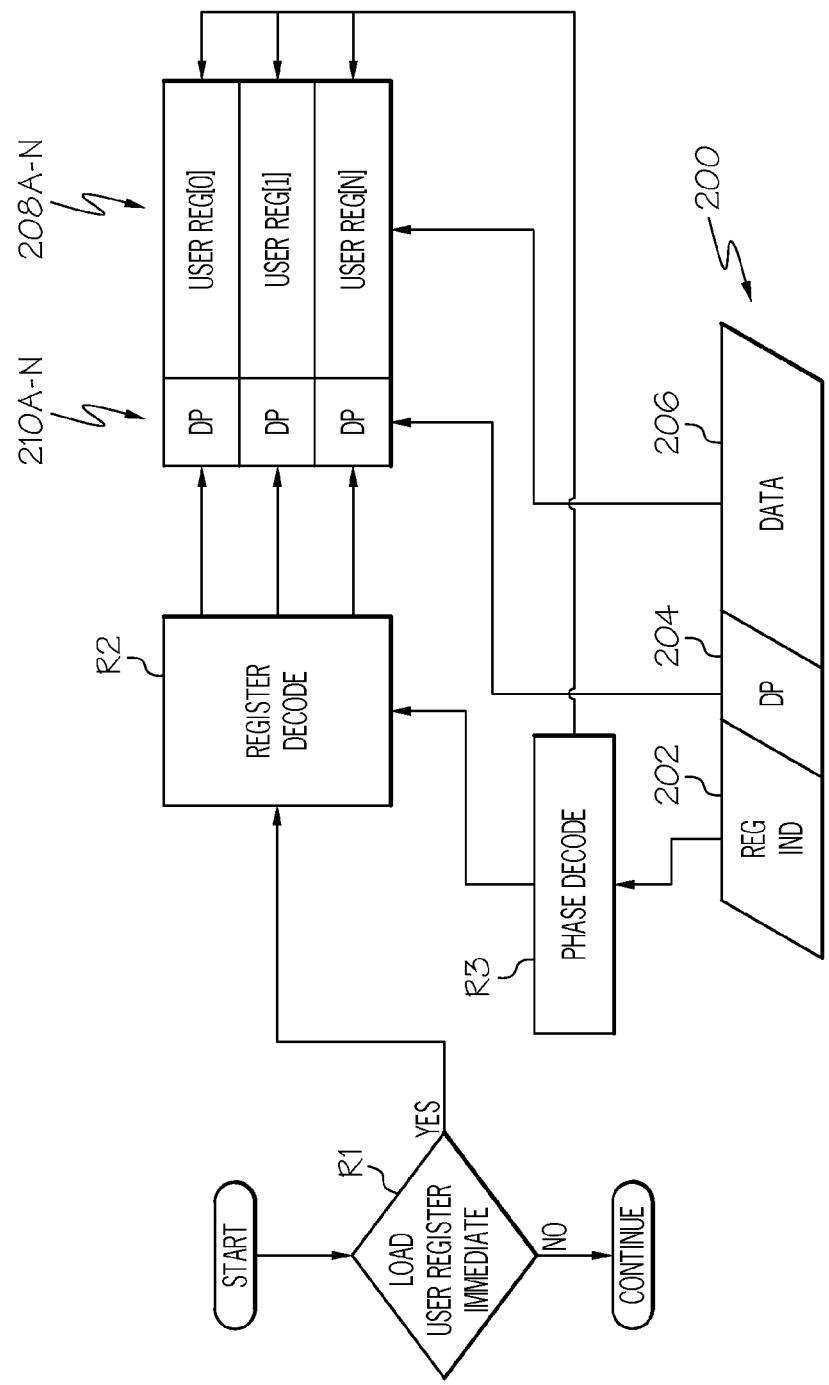
FIG. 8 depicts a process flow diagram according to an embodiment of the present invention.

Another function provided is the ability to clear or set the DP bit in a register with a load immediate data operation as shown in FIG. 8. As depicted, it is determined in step R1 whether a user register load is immediate. If not, the process may continue. If so, a register decode operation is performed in step R2 based on an instruction 202 that is first subjected to a phase decode operation in step R3. As shown, instruction 202 is accompanied in string 200 by DP bit 204 and corresponding data 206. Instructions that load a register 208A-N with immediate data would need to set aside a bit in the instruction to indicate whether this is a load with data protection or a load without data protection. That bit would be used to set or reset the DP bit 210A-N of the appropriate CPU register during a data latch cycle of an instruction execution phase.

Figure 9:
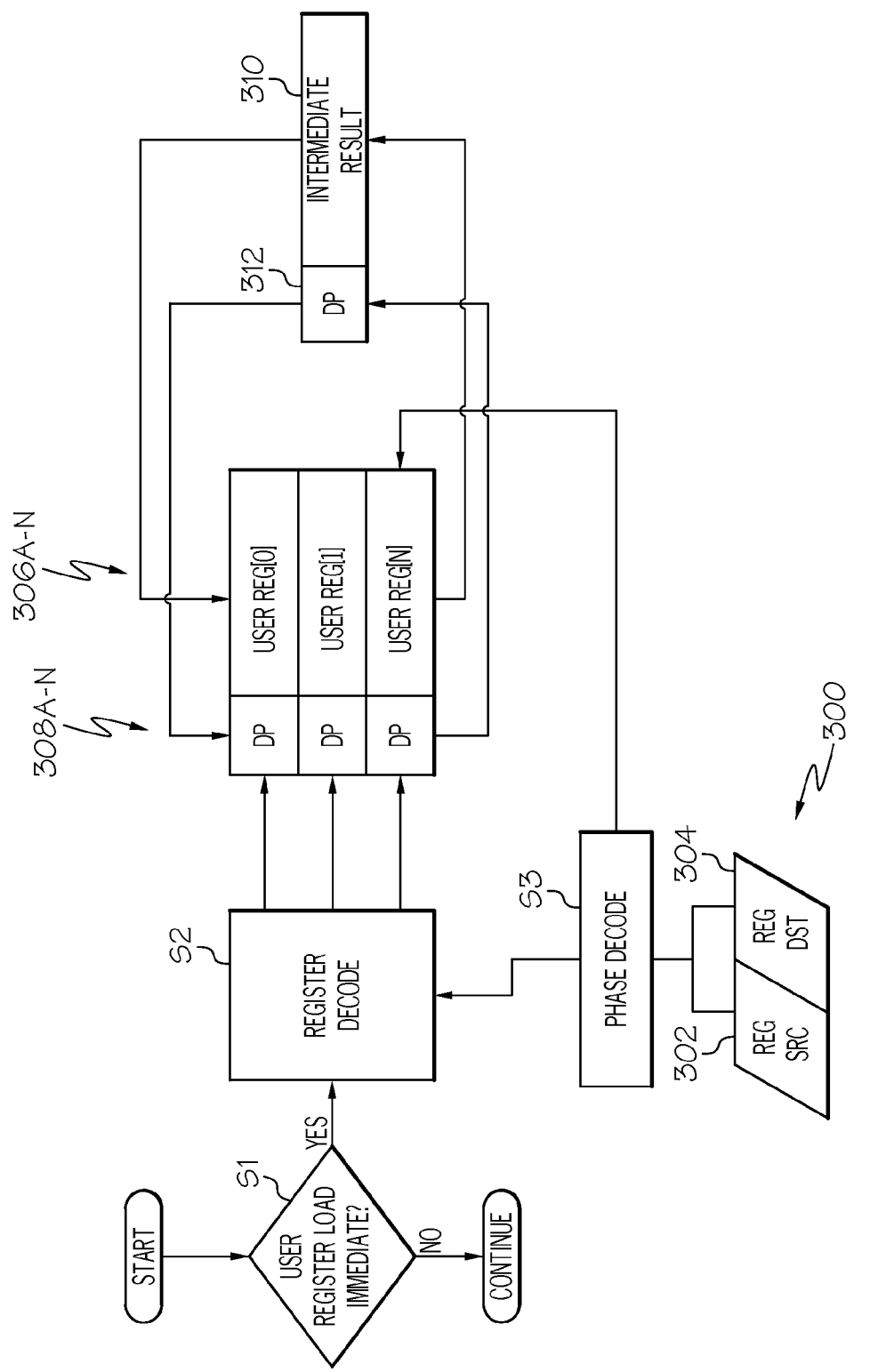
FIG. 9 depicts a process flow diagram according to an embodiment of the present invention.

Another function provided hereunder is the ability to transfer a DP bit 308A-N between registers 306A-N during load or arithmetic operations as shown in FIG. 9. As shown, it is determined in step S1 whether a user register load is immediate. If not, the process may continue. If so, a register decode operation is performed in step S2 based on an instruction 300 (e.g., having source register identifier 302 and a destination register identifier 304 that is first subjected to a phase decode operation in step S3. In one embodiment, an instruction may exist as a latch into a temporary register 310 (e.g., intermediate result) with the DP bit 312 to be transferred. In another embodiment, a load register may exist as arithmetic "add" of zero without side effects through the arithmetic logic unit (ALU) of the CPU. One or more embodiments that may be used to incorporate this function may have an additional bit latched that must be latched in all forms of the instruction in order to include the protection provided by a CPU of this architecture.

Figure 10:
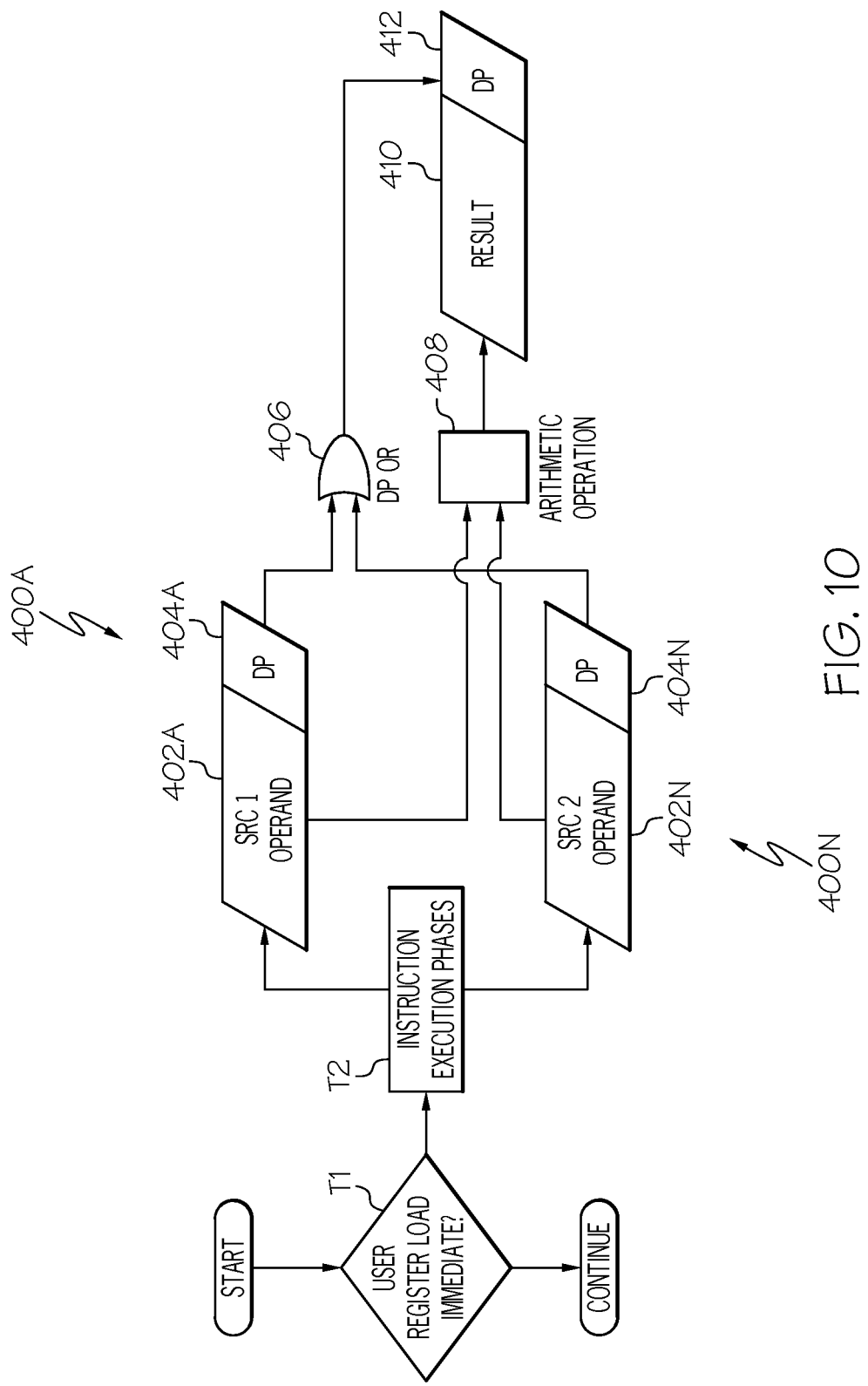
FIG. 10 depicts a process flow diagram according to an embodiment of the present invention.

Another function provided hereunder is the ability to set a DP bit of a result if any operand 402A-N in machine instructions 400A-N has a DP bit 404A-N set (whether from a register or memory reference) as shown in FIG. 10. Specifically, in step TI, it is determined whether a user register is loaded (from a system register). If not, the process may continue. If so, a corresponding instruction is executed in phases in step T2 to yield strings 400A-N that include source operands 402A-N and DP bits 404A-N. The DP bits 404A-N are then "ORed" together via OR gate 406 to produce a DP bit 412 of a result 410. AS further shown, an arithmetic operation 408 may be performed based on operands 402A-N to yield result 410.

Figure 11:
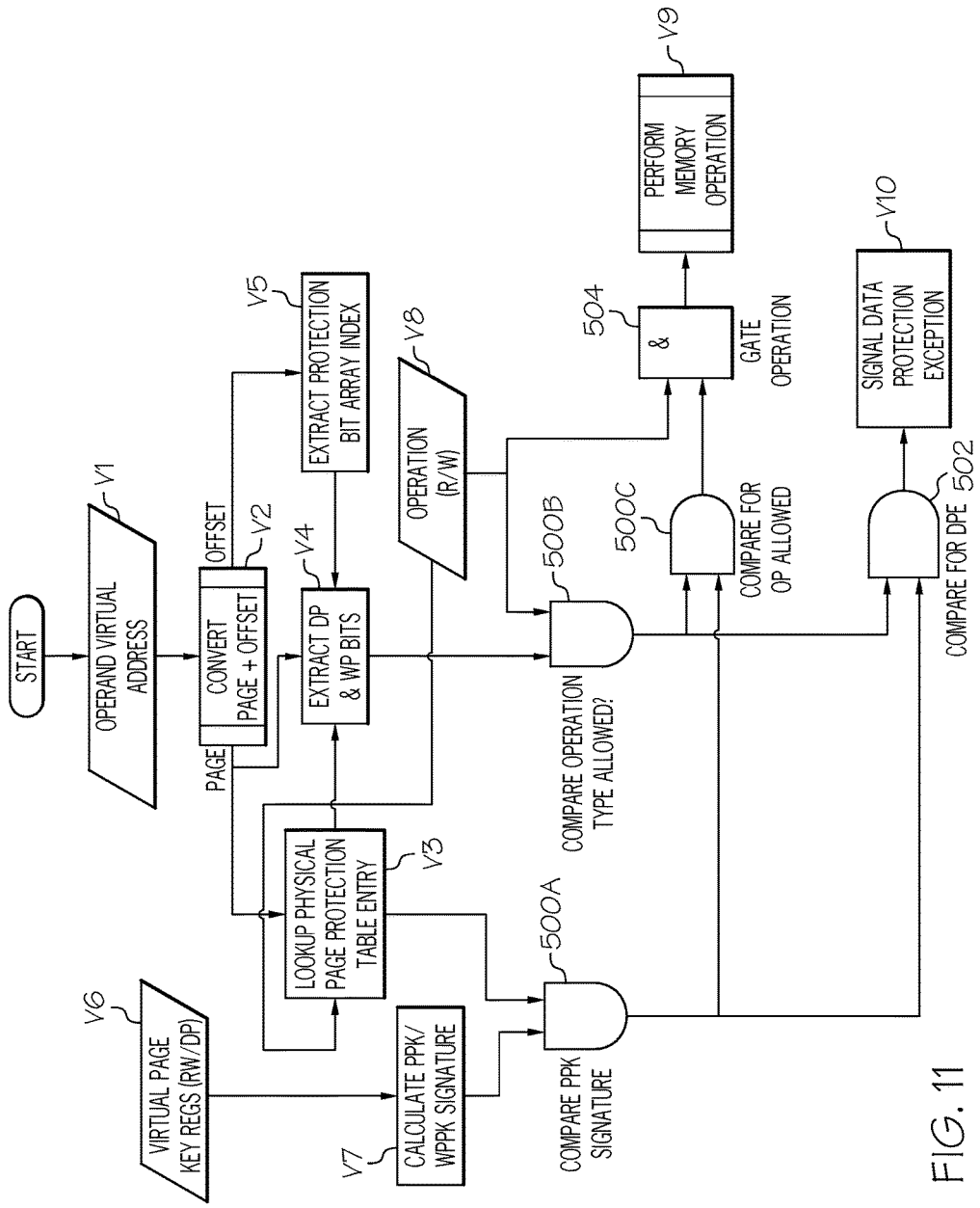
FIG. 11 depicts a process flow diagram according to an embodiment of the present invention.

Another function provided hereunder is the ability to signal a data protection exception (DPE) as shown in FIG. 11. Specifically, a DPE may be triggered if protected data is attempted to be: read into a register, stored from a register, used from an operand from memory, or stored to a result in memory containing a different physical page key signature than the signature of the virtual page key of the current context within the associated activation, process or thread. This process starts with the operand's virtual address and the type of operation (whether read or write) provided in step V1 being converted to a page and an offset in step V2. A lookup is performed in step V3 within a physical page protection table (or physical page table in some embodiments), DP bits and WP bits are extracted in step V4, and a protection bit array index is extracted in step V5. As further shown, in step V6, a virtual page key register will be accessed and a physical page key/write allowed physical page key (PPK/WPPK) signature will be calculated in step V7 as further shown, a series of AND gates 500A-C will be utilized to perform various AND operations as shown (e.g., in conjunction with a read/write (R/W) operation in step V8. In addition, an output of AND gate 500C is subjected to a gate operation via operator 504 with the output of the R/W operation of step V8 so that a memory operation may be performed in step V9. Further yet, outputs of AND gates 500A-B are subjected to an "AND" operation via AND gate 500C as well as a "NAND" operation via NAND gate 502, which then signals a DPE in step V10.

In at least one embodiment of FIG. 11, a separate WPPK exists that would allow some processes to access the page in both read and write modes for certain protected memory granules, whereas others use just a single page PPK for controlled access for both DP as well as for WP functions. As described above, a virtual page number (VPN) and virtual page offset (VPO) are extracted from the operand virtual address. In one embodiment, the VPN may be used to find the virtual page number in the virtual page table (VPT) of the process, from which the physical page table entry (PPTE) is obtained to find the physical page protection table entry (PPPTE). In another embodiment, a reverse-lookup of the physical page table entry or physical page protection table entry may be performed. Additionally, a protection look-aside buffer may be used to reduce the amount of time needed to perform lookups (see US extended memory protection patent). In a PLB environment, the PLB would need to store the DP and WP arrays as well as the PPK and WPPK data.

Once the PPPTE has been retrieved, the PPK or WPPK signature may be compared with the signature of the PPPTE's, PPK or WPPK (PPK for read, WPPK for write unless a single register is used for both). In an illustrative embodiment, a holding register may pre-calculate the PPK and WPPK signatures when the VPK or WVPK register is stored to. This increases performance. Next, the DP and WP bits may be extracted and latched from the PPPTE or PPTE by first selecting the portion of the offset into the page that describes a protected granule of memory, and using that section as an index into the DP and WP bit arrays of the PPPTE. The DP and WP bits are then compared with the output of the PPK or WPPK signature compare to determine if an operation of any kind to this granule of memory is allowed. If the operation is not allowed, a Data Protection Exception (DPE) is set to be signaled. If the operation is to be allowed, the memory operation is allowed to continue.

Another function provided is the ability to signal an illegal operation exception if an attempt is made in the wrong state to load the value of the virtual page key register (See FIG. 7). During instruction decode, the CPU state register is compared to determine if the CPU is in a secured state to allow the load of the VPK register.

I/O Architecture:

I/O architectures today provide a mechanism to place data in a certain memory region and perform the I/O operation through either a direct memory access (DMA) mechanism or through a memory mapped I/O (MMI/O) architecture. In both of these architectures, a region of memory is defined in which the data to be performed either exists or is to be input. With DMA, a DMA device is programmed and subsequently triggered to perform the I/O and indicates its completion through an interrupt. An MM I/O operation is performed through access to an area of physical memory (by address) for which no physical memory exists allowing the I/O device to be selected when that memory address range is targeted for an operation.

In either case, both DMA and MMI/O I/O architectures do not have any type of defined data protection mechanism, and, in fact, such a mechanism would increase the size of data, or conflict with various standards already in place. To compensate for this potential complication, the following architectural definitions may be provided to allow I/O operations to take place successfully on protected memory. The simple definition of such a system is that:

A. For an I/O write operation, memory containing the source to be transmitted to the I/O device would ignore the DP and WP bits. This allows the write operation to complete without knowledge of the operation.

B. For an I/O read operation, memory to which the I/O operation would complete would need to be pre-masked by the operating system to ensure that data protection would exist during the I/O operation itself. This would need to include both the setting of the appropriate PPK for the pages of memory as well as the DP bits, and if the embodiment includes it, the WP bits, so that when the block of memory is returned to the calling program. The memory would be both protected and readable, and if some is not writable, then the WP bits would be set as well.

Figure 12:
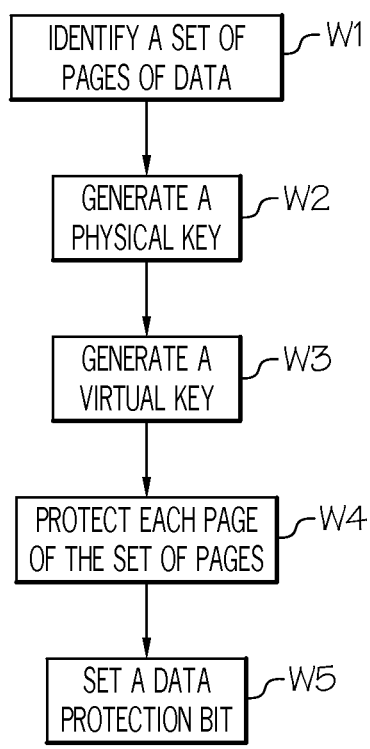
FIG. 12 depicts a method flow diagram according to an embodiment of the present invention.

Referring now to FIG. 12, a method flow diagram according to an embodiment of the present invention is shown (e.g., as enabled by engine 50 of FIG. 2). As depicted, in step W1, a set of pages of data is identified in computer storage. In step W2, a physical key is generated for each page of the set of pages, the physical key being stored in at least one table. In step W3, a virtual key is generated based on each physical key, the virtual key identifying at least one process authorized to use the data, and the virtual key being stored in at least one register. In step W4, each page of the set of pages is protected with a respective physical key and corresponding virtual key. In step W5, a data protection bit is set to a particular setting (e.g., "protective") to indicate a protective status of the set of pages of data.

While shown and described herein as a data security solution, it is understood that the invention further provides various alternative embodiments. For example, in one embodiment, the invention provides a computer-readable/useable medium that includes computer program code to enable a computer infrastructure to provide data security as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data security functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for data security. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for managing data security, comprising:

identifying a set of pages of data in computer storage associated with a computer system;

generating a physical key for each page of the set of pages, the physical key being stored separately from a physical page number in at least one table, the at least one table located within a kernel of an operating system of the computer system;

generating a physical key signature corresponding to each physical key, wherein the physical key signature is smaller than the physical key;

generating a virtual key based on each physical key, the virtual key identifying at least one process authorized to use the data, generating a virtual page key signature corresponding to each virtual key, and the virtual key signature being stored in a virtual page key register, the virtual page key register comprising part of a central processing unit of the computer system, and wherein the virtual page key register is accessible in a system state by the kernel of the operating system only;

protecting each page of the set of pages with a respective physical key and corresponding virtual key;

setting a data protection bit to a particular setting to indicate a protective status of the set of pages of data; and signaling a data protection exception in response to storing the virtual key in the virtual page key register while the central processing unit is in a non-system state.

2. The computer-implemented method of claim 1, further comprising:

receiving a request to access the data for a particular process;

determining if the data protection bit is set to the particular setting;

in response to determining that the data protection bit is set to the particular setting, identifying, based on the at least one table and the virtual page key register, at least one physical key and at least one virtual key that corresponds to the data and the particular process;

determining if the at least one physical key and the at least one virtual key match a physical key and a virtual key associated with the request; and making, based upon the determining, an authentication extermination for the requested access to the data.

3. The computer-implemented method of claim 2, further comprising signaling a data protection exception if any one of the at least one physical key and at least one virtual key mismatch the physical key and the virtual key associated with the request.

4. The computer-implemented method of claim 1, further comprising clearing a set of user registers whose corresponding data protection bits are engaged in response to a virtual page key register being loaded in a system state.

5. The computer-implemented method of claim 1, wherein the physical key is generated for a particular page in response to creation of at least one of: a new activation that references the particular page or a new process that references the particular page.

6. The computer-implemented method of claim 1, further comprising transferring the data protection bit between a set of user registers during at least one of a load operation and an arithmetic operation.

7. The computer-implemented method of claim 1, further comprising setting a data protection bit associated with a data processing result based on a data protection bit associated with an operand of a machine instruction.

8. A system for managing data security, comprising:
a bus;
a processor coupled to the bus; and
a memory medium coupled to the bus, the memory medium comprising instructions to:
identify a set of pages of data in computer storage associated with a computer system;
generate a physical key for each page of the set of pages, the physical key being stored separately from a physical page number in at least one table, the at least one table located within a kernel of an operating system of the computer system;
generate a physical key signature corresponding to each physical key, wherein the physical key signature is smaller than the physical key;
generate a virtual key based on each physical key, the virtual key identifying at least one process authorized to use the data, and generate a virtual page key signature corresponding to each virtual key, and the virtual key signature being stored in a virtual page key register, the a virtual page key register comprising part of a central processing unit of the computer system, and wherein the virtual page key register is accessible in a system state by the kernel of the operating system only;
protect each page of the set of pages with a respective physical key and corresponding virtual key;
set a data protection bit to a particular setting to indicate a protective status of the set of pages of data; and
signal a data protection exception in response to storing the virtual key in the virtual page key register while the central processing unit is in a non-system state.

9. The system of claim 8, the memory medium further comprising instructions to:
receive a request to access the data for a particular process;
determine if the data protection bit is set to the particular setting;
in response to determining that the data protection bit is set to the particular setting, identify, based on the at least one table and the a virtual page key register, at least one physical key and at least one virtual key that corresponds to the data and the particular process;
determine if the at least one physical key and the at least one virtual key match a physical key and a virtual key associated with the request; and
make, based upon the determining, an authentication extermination for the requested access to the data.

10. The system of claim 9, the memory medium further comprising instructions to signal a data protection exception if any one of the at least one physical key and at least one virtual key mismatch the physical key and the virtual key associated with the request.

11. The system of claim 8, the memory medium further comprising instructions to clear a set of user registers whose corresponding data protection bits are engaged in response to a virtual page key register being loaded in a system state.

12. The system of claim 8, wherein the physical key is generated for a particular page in response to creation of at least one of: a new activation that references the particular page or a new process that references the particular page.

13. The system of claim 8, the memory medium further comprising instructions to transfer the data protection bit between a set of user registers during at least one of a load operation and an arithmetic operation.

14. The system of claim 8, the memory medium further comprising instructions to set a data protection bit associated with a data processing result based on a data protection bit associated with an operand of a machine instruction.

15. A computer program product for managing data security, the computer program product comprising a computer readable hardware storage device, and program instructions stored on the computer readable storage media, to:
identify a set of pages of data in computer storage associated with a computer system;
generate a physical key for each page of the set of pages, the physical key being stored separately from a physical page number in at least one table, the at least one table located within a kernel of an operating system of the computer system;
generate a physical key signature corresponding to each physical key, wherein the physical key signature is smaller than the physical key;
generate a virtual key based on each physical key, the virtual key identifying at least one process authorized to use the data, generate a virtual page key signature corresponding to each virtual key, and the virtual key signature being stored in a virtual page key register, the virtual page key register comprising part of a central processing unit of the computer system, and wherein the virtual page key register is accessible in a system state by the kernel of the operating system only;
protect each page of the set of pages with a respective physical key and corresponding virtual key;
set a data protection bit to a particular setting to indicate a protective status of the set of pages of data; and
signal a data protection exception in response to storing the virtual key in the virtual page key register while the central processing unit is in a non-system state.

16. The computer program product of claim 15, further comprising program instructions stored on the computer readable storage media to:
receive a request to access the data for a particular process;

determine if the data projection bit is set to the particular setting;

in response to determining that the data projection bit is set to the particular setting, identify, based on protection the at least one table and the virtual page key register, at least one physical key and at least one virtual key that corresponds to the data and the particular process;

determine if the at least one physical key and the at least one virtual key match a physical key and a virtual key associated with the request; and make, based upon the determining, an authentication extermination for the requested access to the data.

17. The computer program product of claim 16, further comprising program instructions stored on the computer readable hardware storage device to signal a data protection exception if any one of the at least one physical key and at least one virtual key mismatch the physical key and the virtual key associated with the request.

18. The computer program product of claim 15, further comprising program instructions stored on the computer readable hardware storage device to clear a set of user registers whose corresponding data protection bits are engaged in response to a virtual page key register being loaded in a system state.

19. The computer program product of claim 15, wherein the physical key is generated for a particular page in response to creation of at least one of: a new activation that references the particular page or a new process that references the particular page.

20. The computer program product of claim 15, further comprising program instructions stored on the computer readable hardware storage device to transfer the data protection bit between a set of user registers during at least one of a load operation and an arithmetic operation.

21. The computer program product of claim 15, further comprising program instructions stored on the computer readable hardware storage device to set a data protection bit associated with a data processing result based on a data protection bit associated with an operand of a machine instruction.

22. A method for deploying a system for managing data security, comprising:
providing a computer infrastructure being operable to:
identify a set of pages of data in computer storage associated with a computer system;
generate a physical key for each page of the set of pages, the physical key being stored separately from a physical page number in at least one table, the at least one table located within a kernel of an operating system of the computer system;
generate a physical key signature corresponding to each physical key, wherein the physical key signature is smaller than the physical key;
generate a virtual key based on each physical key, the virtual key identifying at least one process authorized to use the data, generate a virtual page key signature corresponding to each virtual key, and the virtual key signature being stored in a virtual page key register, the virtual page key register comprising part of a central processing unit of the computer system;
protect each page of the set of pages with a respective physical key and corresponding virtual key;
set a data protection bit to a particular setting to indicate a protective status of the set of pages of data; and
signal a data protection exception in response to storing the virtual key in the virtual page key register while the central processing unit is in a non-system state.

* * * * *